(12) United States Patent
Melai et al.

(10) Patent No.: US 7,365,999 B2
(45) Date of Patent: Apr. 29, 2008

(54) CIRCUIT ARRANGEMENT

(75) Inventors: Henri Arnoud Ignatius Melai, Eindhoven (NL); Johan Anton Hendrikx, Eindhoven (NL); Bernhard Christiaan Van Dijk, Oss (NL); Paul Robert Veldman, Oss (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 204 days.

(21) Appl. No.: 10/558,724

(22) PCT Filed: May 24, 2004

(86) PCT No.: PCT/IB2004/050761

§ 371 (c)(1),
(2), (4) Date: Nov. 30, 2005

(87) PCT Pub. No.: WO2004/107545

PCT Pub. Date: Dec. 9, 2004

(65) Prior Publication Data
US 2006/0239049 A1    Oct. 26, 2006

(30) Foreign Application Priority Data
Jun. 3, 2003    (EP)    ................................ 03076724

(51) Int. Cl.
*H02M 7/537*    (2006.01)
*G05F 1/575*    (2006.01)

(52) U.S. Cl. ........................................ 363/89; 323/285
(58) Field of Classification Search ................ 323/222, 323/223, 282, 284, 285, 299; 363/81, 84, 363/89
See application file for complete search history.

(56) References Cited

U.S. PATENT DOCUMENTS

| | | | | |
|---|---|---|---|---|
| 5,461,303 A | * | 10/1995 | Leman et al. | ................ 323/222 |
| 5,619,405 A | * | 4/1997 | Kammiller et al. | ........... 363/80 |
| 5,644,214 A | * | 7/1997 | Lee | ............................ 323/211 |
| 5,777,866 A | | 7/1998 | Jacobs et al. | |
| 5,790,395 A | * | 8/1998 | Hagen | ......................... 363/89 |
| 6,104,172 A | | 8/2000 | Josephs et al. | |
| 6,191,564 B1 | | 2/2001 | Mao | |

FOREIGN PATENT DOCUMENTS

| | | |
|---|---|---|
| DE | 3445501 A1 | 6/1986 |
| EP | 1018798 A2 | 7/2000 |
| GB | 2147159 A | 5/1985 |

OTHER PUBLICATIONS

ISR, Written Opinion of the International Searching Authority PCT/IB2004/050761.

* cited by examiner

*Primary Examiner*—Gary L. Laxton

(57) ABSTRACT

In an up-converter supplied by the mains supply and operating in the critical mode, the on-time of the switching element (2) is modulated so that it is increased in the vicinity of the zero crossings of the mains supply voltage. As a result the THD is lowered.

15 Claims, 2 Drawing Sheets

CIRCUIT ARRANGEMENT

Figure 1:
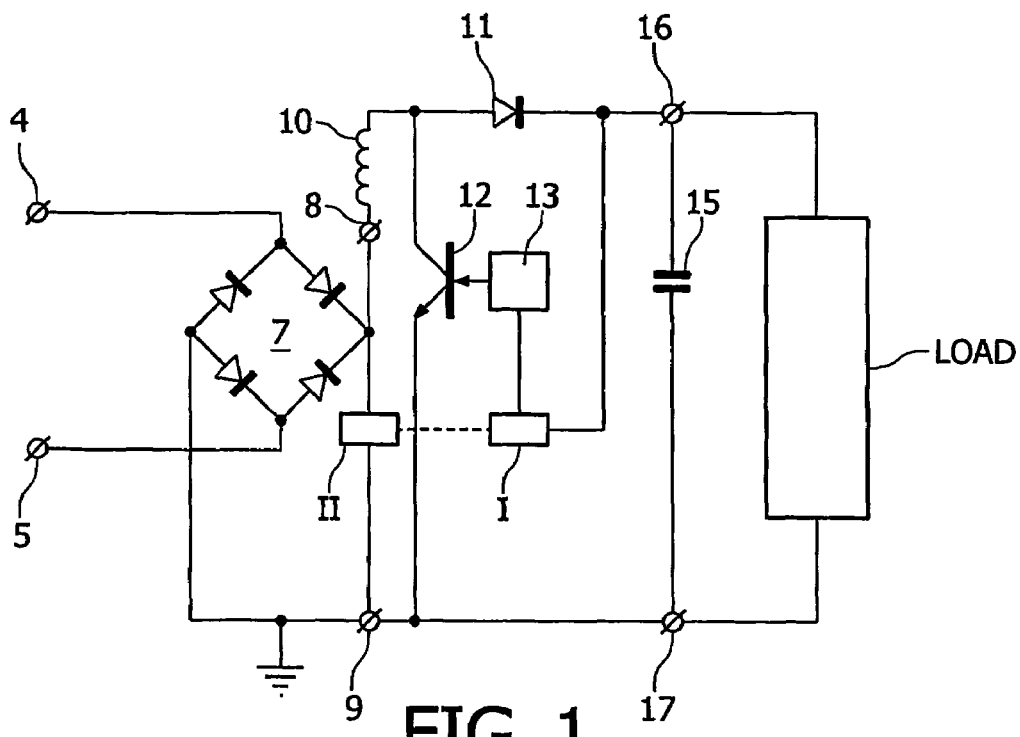

The invention relates to a circuit arrangement comprising:
circuit input terminals for connection to a low frequency supply voltage source,
circuit output terminals,
a rectifier coupled to the circuit input terminals and equipped with rectifier output terminals,
a DC-DC-converter coupled between the rectifier output terminals and the circuit output terminals and comprising
an inductive element,
a unidirectional element coupled to the inductive element,
a switching element coupled to the inductive element and the unidirectional element,
a control circuit coupled to a control electrode of the switching element for rendering the switching element alternately conductive and non-conductive at a high frequency and for generating a control signal for controlling the conduction time of the switching element in each high frequency period, said control circuit comprising a circuit part I for generating a first signal S1 that is either a constant or exclusively depends on the actual voltage between the output terminals and a desired value of the voltage between the output terminals.

The invention also relates to a ballast circuit for operating a lamp.

A circuit arrangement as mentioned in the opening paragraph is known from Texas Instruments application note U-132 for the integrated circuit UC 3852. The DC-DC-converter comprised in the known circuit arrangement is an up-converter that is supplied by a rectified low frequency supply voltage and is operated in the critical mode. This means that the switching element is rendered conductive when the current through the inductive element has dropped to zero. This has the advantage that the power dissipation in the unidirectional element generally indicated as reverse recovery loss is very limited, so that operation in the critical mode is relatively efficient. The current through the inductive element has the shape of a series of triangles. Normally it is desirable that the average value (averaged over a high frequency period) of the current through the inductive element is proportional to the rectified low frequency supply voltage to obtain a high power factor and low THD. One way of achieving this is to maintain the conduction time of the switching element at the same constant value during half a period of the low frequency supply voltage: in the known circuit arrangement the control signal is identical to the signal S1 and the signal S1 is only influenced by the actual and the desired value of the voltage between the output terminals. In other words the shape of the current through the inductive element is controlled by means of open loop control or feed forward control. Circuit part I increases the conduction time in case the amplitude of the low frequency supply voltage decreases or in case the power consumed from the output terminals increases, in order to maintain the voltage between the output terminals at a value that substantially equals the desired value and is independent from the amplitude of the low frequency supply voltage or the amount of power consumed at the output terminals. Similarly, circuit part I decreases the conduction time in case the amplitude of the low frequency supply voltage increases or in case the power consumed from the output terminals decreases.

Alternatively circuit part I will also increase or decrease the conduction time of the switching element in case a user of the circuit arrangement demands a higher voltage or a lower voltage respectively between the output terminals and therefore adjusts the desired value of the voltage between the output terminals. However, during stationary operating conditions, the changes in the conduction time are taking place at a comparatively slow rate so that the signal S1 and therefore the conduction time of the switching element are substantially constant over half a period of the low frequency supply voltage. Although such a substantially constant value of the conduction time of the switching element should theoretically result in a very high power factor and a low THD, there are some deviations in practical circuits. Since there is always some input capacitance present at the input of the DC-DC-converter, such as a filter capacitor or a parasitary capacitance, the supply voltage of the DC-DC-converter differs from the rectified mains since in the vicinity of the zero crossings of the low frequency supply voltage the voltage across the input capacitance will not completely drop to zero. As a consequence the amplitude of the low frequency supply voltage is lower than the voltage across the input capacitance so that no current is drawn from the low frequency supply voltage source in the vicinity of the zero crossings of the low frequency supply voltage. The resulting current distortion lowers the power factor and increases the THD.

It is remarked that the same problem can arise in a circuit arrangement in which the signal S1 is a constant that is not influenced by any operational parameter. In this latter case the constant value of signal S1 will cause the power factor to be comparatively high and the THD to be comparatively low, but the voltage between the output terminals will change when the maximum amplitude of the low frequency supply voltage or the power consumed at the output terminals changes.

Another problem occurring in the vicinity of the zero crossings of the low frequency supply voltage is the following. Because of the low amplitude of the low frequency supply voltage, the amount of energy that is stored in the inductive element during each high frequency period is very small. When the switching element is rendered non-conductive this energy should cause a current to flow through the unidirectional element to the circuit output terminals. However, before the unidirectional element becomes conductive, the energy stored in the inductive element first charges the parasitary capacitance associated with a common terminal of the inductive element, the unidirectional element and the switching element. In case the energy stored in the inductive element is so low that it does not suffice to charge the parasitary capacitance to a voltage high enough to render the unidirectional element conductive, no net current flows from the low frequency supply voltage source to the circuit output terminals. Also this latter problem causes the current drawn from the low frequency supply voltage to become zero in the vicinity of the zero crossings of the low frequency supply voltage so that the power factor is lowered and THD is increased.

The invention aims to provide a circuit arrangement wherein the control circuit is comparatively simple and therefore cheap while the control circuit yet controls the switching element in such a way that a comparatively high power factor is obtained while the THD is comparatively low.

A circuit arrangement as mentioned in the opening paragraph is therefore according to the invention characterized in that the control circuit is further equipped with a circuit part II for generating a second signal S2 that is periodical and has the same phase and frequency as the rectified low frequency supply voltage and for generating the control signal by superimposing the second signal S2 on the first signal S1.

The control signal thus is the sum of signal S1 and signal S2. Since the second signal S2 varies over half a period of the supply voltage the same is true for the control signal, so that the on-time of the switching element varies over each half period of the low frequency supply voltage. The shape of signal S2 is chosen so that the on-time of the switching element is increased in the vicinity of the zero crossings of the low frequency supply voltage. As a result, more current is drawn from the low frequency supply voltage source in the vicinity of the zero crossings of the low frequency supply voltage so that the power factor is increased and the THD is lowered. It be mentioned that also in case of a circuit arrangement according to the invention the current drawn from the mains supply is zero as long as the momentary amplitude of the mains supply voltage is lower than the voltage across the input capacitance. However, as soon as the momentary amplitude of the mains supply is higher than the voltage across the input capacitance, the circuit part II ensures that a much higher current is drawn from the mains supply than is the case in prior art circuits in which the conduction time is maintained at a constant value during each half a period of the mains supply voltage. It is this increased mains current in the vicinity of the zero crossings of the mains supply voltage, when the mains voltage amplitude is higher than the voltage across the input capacitance, that improves the power factor and lowers the THD.

In the known circuit arrangement in which the conduction time of the switching element is controlled at a substantially constant value during each half period of the low frequency supply voltage, the frequency at which the switching element is controlled reaches the highest value in the vicinity of the zero crossings of the low frequency supply voltage. In a circuit arrangement according to the invention, the circuit part II, by increasing the conduction time, lowers this highest frequency. As a result the frequency range within which the control circuit must function is decreased, simplifying the design of the control circuit.

Good results have been obtained for embodiments of a circuit arrangement according to the invention, wherein the second signal is proportional to the rectified low frequency supply voltage. It is remarked that the sign of the proportionality factor depends on the relation between control signal and conduction time. In case the circuit arrangement is so designed that a higher value of the control signal corresponds to a shorter conduction time the proportionality factor is positive so that the signal S2 is directly proportional to the rectified low frequency supply voltage. However, in case the circuit arrangement is so designed that a higher value of the control signal corresponds to a longer conduction time, the proportionality factor is negative so that the signal S2 is in fact invertedly proportional to the rectified low frequency supply voltage. Since the rectified low frequency supply voltage is present at the output of the rectifier, the circuit part II can be comparatively simple. The circuit part II may for instance comprise a coupling capacitor coupled between the rectifier and circuit part I or it may comprise a series arrangement of a first impedance and a second impedance coupled between the rectifier output terminals and wherein a common terminal of the two impedances is coupled to an output of the circuit part I.

Even better results have been obtained for embodiments of a circuit arrangement according to the invention, wherein the second signal is proportional to the rectified low frequency supply voltage when the amplitude of the rectified low frequency supply voltage is lower than a predetermined reference value and substantially equal to the predetermined reference value when the amplitude of the rectified low frequency supply voltage is higher than the predetermined reference value. It has been found that the resulting modulation of the on-time of the switching element over half a period of the low frequency supply voltage increased the power factor and lowered the THD even further with respect to embodiments in which the signal S2 is proportional to the rectified low frequency supply voltage. Such a shape of the signal S2 can be realized in a comparatively simple way, in case the circuit part II comprises a zener diode. The circuit part I may comprise a series arrangement of a first impedance and a second impedance coupled between the rectifier output terminals and wherein a common terminal of the two impedances is coupled to an output of the circuit part I, and wherein at least one of the impedances is a voltage dependant impedance. The first impedance may comprise an ohmic resistor while the second impedance comprises a parallel arrangement of an ohmic resistor and a zener diode.

Good results have also been obtained for embodiments wherein the first impedance comprises a series arrangement of a zener diode and an ohmic resistor and the second impedance comprises an ohmic resistor, and for embodiments wherein the first impedance comprises an ohmic resistor and the second impedance comprises an ohmic resistor shunted by a diode. Good results have further been obtained for embodiments in which the first impedance comprises a series arrangement of a zener diode and an ohmic resistor, while the second impedance comprises an ohmic resistor shunted by a diode.

Very low values of the THD have been obtained for embodiments of a circuit arrangement according to the invention, wherein the DC-DC-converter is an up-converter. Because of its low THD and high power factor combined with a very simple design of the control circuit, a circuit arrangement according to the invention is very suitable for use in a ballast circuit.

Embodiments of a circuit arrangement according to the invention will be described making use of a drawing. In the drawing FIG. 1 shows an embodiment of a circuit arrangement according to the invention with a load connected to it, and FIGS. 2-7 show different implementations of a part of the circuit arrangement shown in FIG. 1.

Figure 4:
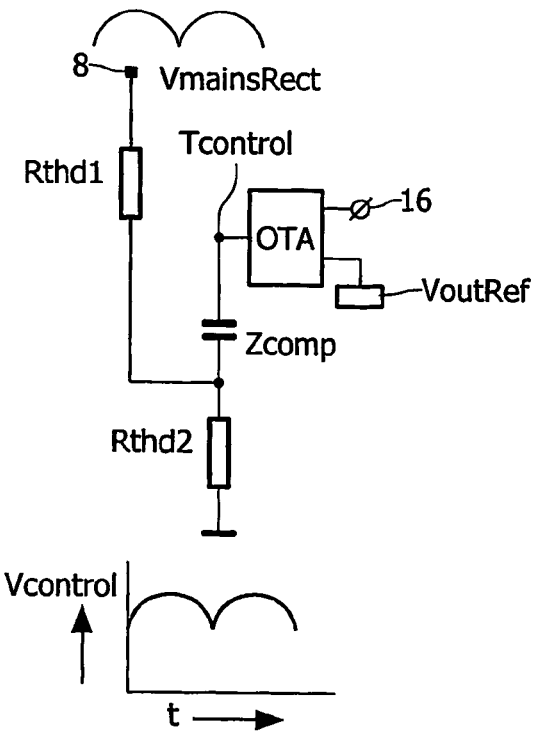
Figure 5:
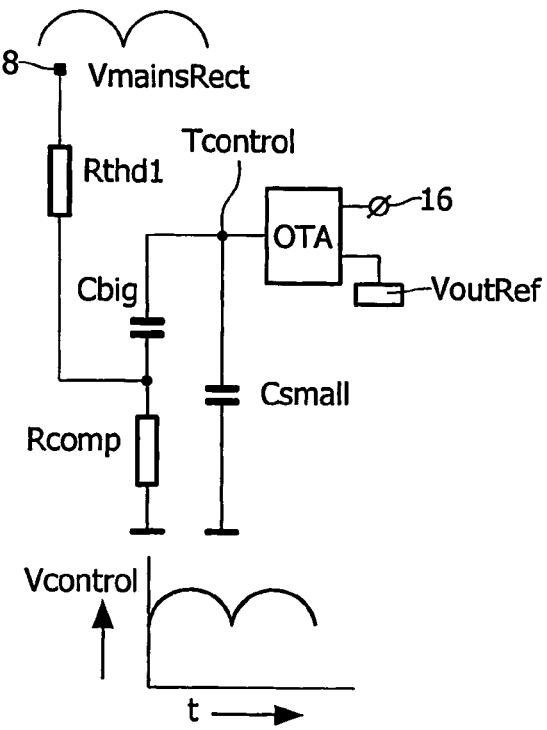

In FIGS. 1, 4 and 5 are circuit input terminals for connection to a low frequency supply voltage source. Circuit input terminals 4 and 5 are connected to respective input terminals of diode bridge 7, forming a rectifier. 8 and 9 are rectifier output terminals of the rectifier formed by the diode bridge 7. Diode bridge output terminals 8 and 9 are connected by means of a series arrangement of inductive element 10 and switching element 12. Switching element 12 is shunted by a series arrangement of a diode 11, forming a unidirectional element, and a capacitor 15. A common terminal 16 of diode 11 and capacitor 15 forms a first circuit output terminal of the circuit arrangement. A second circuit output terminal 17 of the circuit arrangement is situated between diode bridge output terminal 9 and capacitor 15. A load is connected between output terminals 16 and 17. An output terminal of circuit part 13 is connected to a control electrode of switching element 12. Circuit part 13 is a circuit part for rendering switching element 12 alternately conductive and non-conductive at a high frequency. An input terminal of circuit part 13 is connected to an output terminal of circuit part I. Circuit part I is a circuit part for generating a signal S1 that in this embodiment exclusively depends on a desired value and the actual value of the voltage between the output terminals. An output terminal of circuit part II is coupled to circuit part I. In FIG. 1 this coupling is indicated by means of a dotted line. Circuit part II is a circuit part for generating a second signal S2 that is periodical and has the same phase and frequency as the rectified low frequency supply voltage and for generating the control signal by superimposing the second signal S2 on the first signal S1. Respective input terminals of circuit part II are connected to the diode bridge output terminals 8 and 9 respectively. Circuit parts 13, I and II together form a control circuit coupled to the control electrode of the switching element. Inductive element 10, switching element 12, diode 11 and the control circuit together form a DC-DC-converter of the type up-converter.

The operation of the circuit arrangement shown in FIG. 1 is as follows.

When circuit input terminals 4 and 5 are connected to a low frequency supply voltage source, a DC voltage with the approximate shape of a rectified sine wave is present between diode bridge output terminals 8 and 9. Circuit part 13 renders the switching element 12 alternately conductive and non-conductive at a high frequency. As a result, a DC-voltage with an amplitude higher than the maximum amplitude of the low frequency supply voltage is present across capacitor 15 supplying the load. The current through the inductive element increases linearly, when the switching element 12 is conductive and decreases linearly when the switching element 12 is non-conductive. The up-converter is operated in the critical mode. This means that the switching element is rendered conductive when the current through the inductive element has become equal to zero. As a result the shape of the current through the inductive element is a series of triangles. Theoretically the average current drawn from the low frequency supply voltage source has a shape identical to and in phase with the low frequency supply voltage, in case the conduction time of the switching element is constant over each half a period of the low frequency supply voltage. In practice however, because of for instance filter capacitances or parasitic capacitances, it is found that no current is drawn in the vicinity of the zero crossings of the low frequency supply voltage causing a substantial amount of THD. Such a parasitic capacitance or capacitor may for instance be present between circuit input terminals 4 and 5. Alternatively such a parasitic capacitance or capacitor may be present between diode bridge output terminals 8 and 9. These parasitic capacitances or capacitors are not shown in FIG. 1. In a circuit arrangement according to the present invention the control signal is the sum of a first signal S1, that is substantially constant over each half a period of the low frequency supply voltage and a second signal S2, that is periodical and has the same phase and frequency as the rectified low frequency supply voltage. As a result, the control signal effects a modulation of the conduction time of the switching element 12. This modulation is chosen so that the conduction time of the switching element is increased in the vicinity of the zero crossings of the low frequency supply voltage. Consequently, more current is drawn from the low frequency supply voltage source in the vicinity of the zero crossings of the low frequency supply voltage so that the power factor is increased and the THD is lowered.

FIGS. 2-7 show an implementation of circuit part I and different implementations of circuit part II. In each of the FIGS. 2-7 the shape of the control signal that is the sum of signals S1 and S2 generated by circuit part I and circuit part II respectively is shown.

Figure 2:
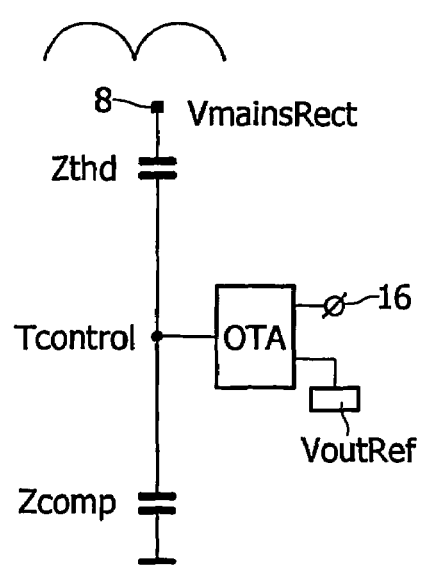
Figure 2:
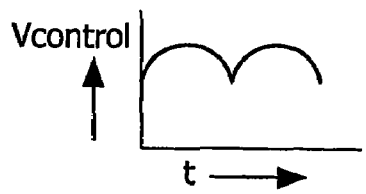

In the circuitry shown in each of the figures a circuit part OTA forming a transconductance amplifier is present is present. A transconductance amplifier is a circuit part that generates an output current that is proportional to the difference between the voltages present at its input terminals. A first input terminal of transconductance amplifier OTA is connected to output terminal 16 and a second input terminal is connected to the output terminal of a circuit part Voutref. The circuit part Voutref generates a signal that represents a desired value of the output voltage of the up-converter. An output terminal of the transconductance amplifier is connected to a terminal Tcontrol. In FIG. 2, a capacitor Zcomp connects the terminal Tcontrol to diode bridge output terminal 9. The circuit parts OTA and Voutref together with capacitor Zcomp form a circuit part I for for generating a first signal S1 exclusively depending on a desired value and the actual value of the voltage between the output terminals. The value of signal S1 is substantially constant during each half period of the low frequency supply voltage. It is remarked that the signal representing a desired value of the output voltage of the up-converter can be adjustable by a user. The terminal Tcontrol is connected to diode bridge output terminal 8 by means of capacitor Zthd. Capacitor Zthd together with diode bridge 7 form a circuit part II for generating a second signal S2 that is periodical and has the same phase and frequency as the rectified low frequency supply voltage and for generating the control signal by superimposing the second signal S2 on the first signal S1. The second signal S2 is directly proportional to the rectified low frequency supply voltage. The control signal present at terminal Tcontrol thus has a higher value when the amplitude of the low frequency supply voltage is high than in the vicinity of the zero crossings of the low frequency supply voltage. The control circuit is so designed that an increase of the control signal corresponds to a decrease of the conduction time and vice versa The control signal Vcontrol is present at terminal T control and is the sum of a substantially constant voltage and a voltage that is proportional to the rectified low frequency supply voltage and is shown in FIG. 2.

Figure 3:
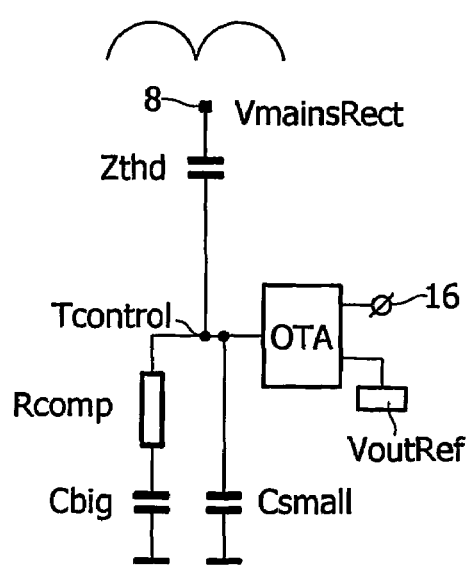
Figure 3:
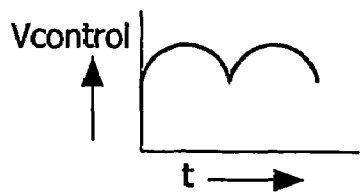

In the circuitry shown in FIG. 3 the capacitor Zcomp present in the circuitry shown in FIG. 2 has been replaced by a parallel arrangement of a series arrangement of ohmic resistor Rcomp and capacitor Cbig and capacitor Csmall. The voltage at the output terminal Tcontrol can thereby be more stably controlled at a certain level for instance when the power consumed at the output terminals is changed. The functioning of the circuitry shown in FIG. 3 is very similar to that of the circuitry shown in FIG. 2 and will therefor not be described separately. The shape of the control signal Vcontrol is similar to the control signal shown in FIG. 2.

In FIG. 4 the signal S2 is superimposed on the output signal S1 of the transductance amplifier OTA making use of a series arrangement of two ohmic resistors Rthd1 and Rthd2 instead of making use of capacitor Zthd as in FIG. 2. Ohmic resistor Rthd2 is in series with Zcomp. In FIG. 4 the ohmic resistors Rthd1 and Rthd2 together with diode bridge 7 form the circuit part II.

In FIG. 5 the signal S2 is superimposed on the output signal S1 of the integrator INT making use of a series arrangement of two ohmic resistors Rcomp and Rthd1 instead of making use of capacitor Zthd as in FIG. 3. In FIG. 5 the ohmic resistors Rthd1 and Rcomp together with diode bridge 7 form the circuit part II. The circuit part I is formed by the circuit parts Voutref and OTA, capacitors Cbig and Csmall and ohmic resistor Rcomp. The shape of the control signal Vcontrol generated by the embodiments of the control circuit shown in FIG. 4 and FIG. 5 is similar to the shape shown in FIG. 2 or FIG. 3.

In each of the FIG. 2-5 the second signal S2 is directly proportional to the rectified low frequency supply voltage. As a result, the conduction time of the switching element is increased in the vicinity of the zero crossings of the low frequency supply voltage and decreased when the amplitude of the rectified low frequency supply voltage is comparatively high. In the circuitry shown in FIGS. 6 and 7 the shape of the second signal S2 is different.

Figure 6:
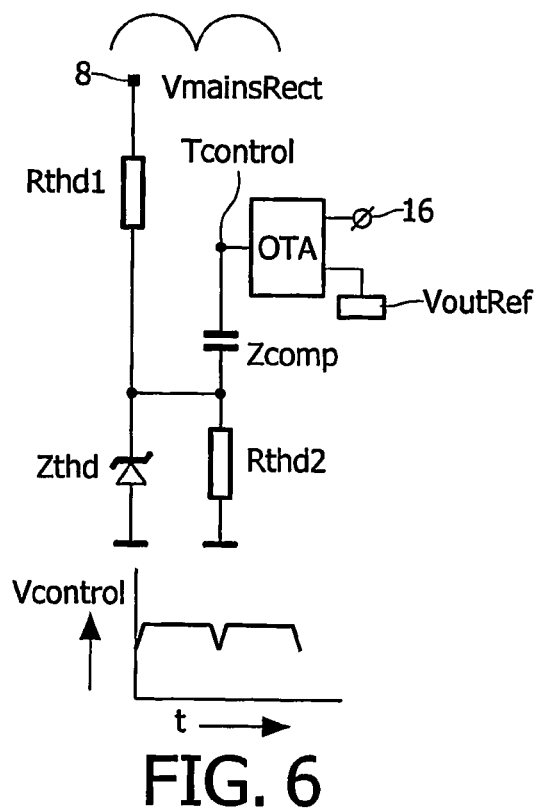

The circuitry shown in FIG. 6 can be thought of as derived from the circuitry in FIG. 4 by the addition of a zener diode Zthd shunting ohmic resistor Rthd2. When the amplitude of the rectified low frequency supply voltage is low, the zener diode Zthd is non-conductive and the signal S2 is therefor proportional to the rectified low frequency supply voltage. When the amplitude of the rectified low frequency supply voltage increases, the zener diode becomes conductive and the amplitude of signal S2 therefor is substantially constant. The resulting shape of the control signal is also shown in FIG. 6. As a consequence the signal S2 decreases the amplitude of the control signal and thereby increases the conduction time of the switching element only in the vicinity of the zero crossings of the low frequency supply voltage. In the circuitry shown in FIG. 6, ohmic resistors Rthd1 and Rthd2, zener diode Zthd and diode bridge 7 together form the circuit part II for generating signal S2.

Figure 7:
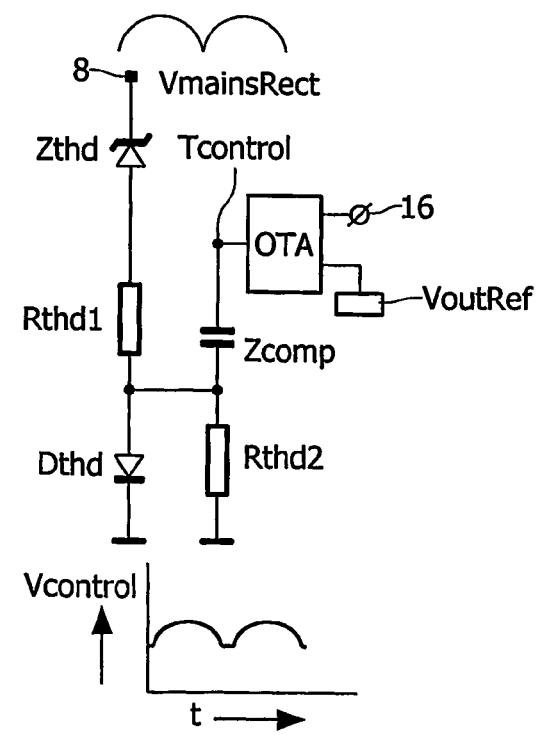

The circuitry shown in FIG. 7 can be thought of as derived from the circuitry in FIG. 3 by placing a zener diode Zthd in series with ohmic resistor Rthd1 and shunting Rthd2 with a diode Dthd. In the direct vicinity of the zero crossings of the low frequency supply voltage the amplitude of the rectified low frequency supply voltage is so low that the zener diode Zthd is non-conductive and signal S2 equals zero. When the momentary amplitude of the rectified low frequency supply voltage becomes is high enough to render zener diode Zthd conductive, the signal S2 is proportional to the rectified low frequency supply voltage diminished by the voltage drop over zener diode Zthd. When the momentary amplitude of the rectified low frequency supply voltage increases further, diode Dthd becomes conductive as well. As long as the diode Dthd is conductive, signal S2 increases and decreases far less rapidly than the rectified low frequency supply voltage, resulting in the shape of the control signal Vcontrol shown in FIG. 7. Since the modulation depth is decreased with respect to the embodiments shown in the other Figures the range over which the conduction time is varied by the modulation is smaller allowing a simpler design of the control circuit.

In a practical embodiment of the circuit arrangement shown in FIG. 1 supplied with a low frequency supply voltage with an rms value of 230 Volt and a frequency of 50 Hz, it was found that the THD was 14.6% in case the signal S2 was zero, in other words when no modulation of the conduction time of the switching element was effected. In case a control circuit as shown in FIG. 2 was used, the THD was reduced to 10.1% and in case a control circuit as shown in FIG. 6 was used the THD was reduced to 6%.

The invention claimed is:

1. A circuit arrangement comprising
circuit input terminals for connection to a low frequency supply voltage source that provides a low frequency supply voltage,
circuit output terminals,
a rectifier coupled to the circuit input terminals and equipped with rectifier output terminals for outputting a rectified low frequency supply voltage,
a DC-DC-converter coupled between the rectifier output terminals and the circuit output terminals and comprising:
an inductive element,
a unidirectional element coupled to the inductive element,
a switching element coupled to the inductive element and the unidirectional element,
a control circuit coupled to a control electrode of the switching element for rendering the switching element alternately conductive and non-conductive at a high frequency and for generating a control signal for controlling the conduction time of the switching element in each high frequency period, said control circuit comprising a first circuit part for generating a first signal S1 that is either a constant or exclusively depends on the actual voltage between the output terminals and a desired value of the voltage between the output terminals,
wherein the control circuit is further equipped with a second circuit part for generating a second signal S2 that is periodical and has a same phase and frequency as the rectified low frequency supply voltage and for generating the control signal by superimposing the second signal S2 on the first signal S1 so that the control signal includes a periodic signal having a DC bias.

2. The circuit arrangement according to claim 1, wherein the second signal S2 is proportional to the rectified low frequency supply voltage.

3. The circuit arrangement according to claim 1, wherein the second signal is proportional to the rectified low frequency supply voltage when the amplitude of the rectified low frequency supply voltage is lower than a predetermined reference value and substantially equal to the predetermined reference value when the amplitude of the rectified low frequency supply voltage is higher than the predetermined reference value.

4. The circuit arrangement according to claim 1, wherein the second circuit part comprises a coupling capacitor coupled between the rectifier and the first circuit part.

5. A The circuit arrangement according to claim 1, wherein the DC-DC-converter is an up-converter.

6. A ballast circuit for operating a lamp comprising a circuit arrangement according to claim 1.

7. The circuit arrangement of claim 1, wherein the control signal is configured to increase the conduction time in a vicinity of a zero crossings of the low frequency supply voltage.

8. A circuit arrangement comprising
circuit input terminals for connection to a low frequency supply voltage source,
circuit output terminals,
a rectifier coupled to the circuit input terminals and equipped with rectifier output terminals,
a DC-DC-converter coupled between the rectifier output terminals and the circuit output terminals and comprising
an inductive element,
a unidirectional element coupled to the inductive element,
a switching element coupled to the inductive element and the unidirectional element,
a control circuit coupled to a control electrode of the switching element for rendering the switching element alternately conductive and non-conductive at a high frequency and for generating a control signal for controlling the conduction time of the switching element in each high frequency period, said control circuit comprising a first circuit part for generating a first signal S1 that is either a constant or exclusively depends on the actual voltage between the output terminals and a desired value of the voltage between the output terminals, wherein the control circuit is further equipped with a second circuit part for generating a second signal S2 that is periodical and has the same phase and frequency as the rectified low frequency supply voltage and for generating the control signal by superimposing the second signal S2 on the first signal S1, wherein the second circuit part comprises a series arrangement of a first impedance and a second impedance, coupled between the rectifier output terminals and wherein a common terminal of the impedances is coupled to an output of the first circuit part.

9. The circuit arrangement according to claim 8, wherein at least one of the impedances is a voltage dependant impedance.

10. The circuit arrangement according to claim 9, wherein the first impedance comprises an ohmic resistor and the second impedance comprises a parallel arrangement of an ohmic resistor and a zener diode.

11. The circuit arrangement according to claim 9, wherein the first impedance comprises a series arrangement of a zener diode and an ohmic resistor and the second impedance comprises an ohmic resistor.

12. The circuit arrangement according to claim 9, wherein the second impedance comprises an ohmic resistor shunted by a diode.

13. A circuit arrangement comprising:
a rectifier configured to rectify a supply voltage to form a rectified signal; and
a DC-DC-converter coupled between the rectifier and output terminals of the circuit arrangement;
wherein the DC-DC-converter comprises a switching element controlled by a control signal from a control circuit;
the control signal generating the control signal by superimposing a first signal on a second signal so that the control signal includes a periodic signal having a DC bias.

14. The circuit arrangement of claim 13, wherein the control signal is configured to increase a conduction time of the switching element in a vicinity of a zero crossings of the supply voltage.

15. The circuit arrangement of claim 13, wherein the first signal is generated by a first circuit and the second signal is generated by a second circuit, the second circuit comprising a series arrangement of two impedance impedances, coupled between output terminals of the rectifier, and wherein a common terminal of the two impedances is coupled to an output of the first circuit.

* * * * *